United States Patent [19]
Garrison et al.

[11] 3,920,547
[45] Nov. 18, 1975

[54] METHOD OF DESTROYING CYANIDES

[75] Inventors: Richard Lee Garrison, Pearland; Herman W. Prengle, Jr., Friendswood; Charles E. Mauk, Houston, all of Tex.

[73] Assignee: Houston Research, Inc., Houston, Tex.

[22] Filed: May 6, 1974

[21] Appl. No.: 467,080

[52] U.S. Cl. .................................................. 210/63
[51] Int. Cl.² .......................................... C02B 1/18
[58] Field of Search .......... 21/54 R, 102 R, DIG. 2; 96/60 BF, 60 R; 210/63, 64, 62; 204/176; 423/365, 367

[56] References Cited
UNITED STATES PATENTS

| | | | |
|---|---|---|---|
| 1,420,046 | 6/1922 | MacGregor et al. | 210/63 |
| 2,459,464 | 1/1949 | Smith | 210/63 X |
| 2,981,682 | 4/1961 | Lancy | 210/62 |
| 3,510,424 | 5/1970 | Zumbrunn | 210/63 |
| 3,660,277 | 5/1972 | McWhirter et al. | 210/63 X |
| 3,732,163 | 5/1973 | Lapidot | 210/63 X |
| 3,819,516 | 6/1974 | Murchison et al. | 210/63 |
| 3,825,494 | 7/1974 | Call et al. | 21/DIG. 2 |

*Primary Examiner*—Thomas G. Wyse
*Assistant Examiner*—Robert H. Spitzer
*Attorney, Agent, or Firm*—Arnold, White & Durkee

[57] ABSTRACT

A method for the destruction of cyanides in an aqueous cyanide solution, particularly an aqueous solution of cyanides complexed with iron, wherein such cyanides are destroyed by contacting an aqueous solution thereof with an ozone-containing gas, while simultaneously irradiating the aqueous cyanide solution with ultraviolet light. The method is preferably carried out while maintaining the pH of the aqueous cyanide solution within the range of pH 5 to pH 9. Increased reactivity can also be achieved by heating the aqueous cyanide solution.

The method is preferably carried out by contacting the aqeuous cyanide solution and an ozone-containing gas in a plurality of separate contact zones, countercurrently or with parallel flow, with the irradiation of the aqueous cyanide solution with ultraviolet light being carried out in at least one of the separate contact zones, preferably at least the final contact zone.

13 Claims, 1 Drawing Figure

U.S. Patent  Nov. 18, 1975  3,920,547
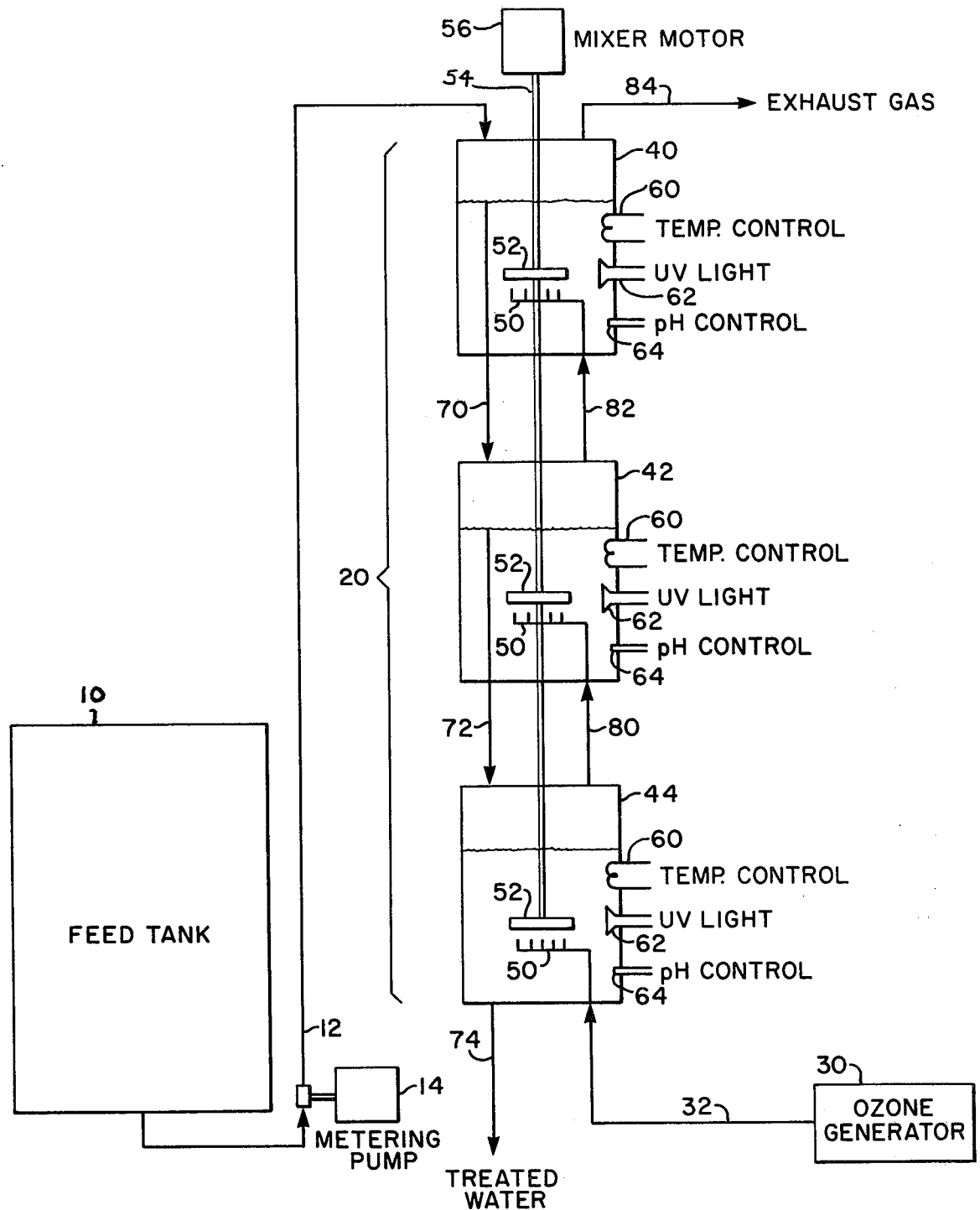

METHOD OF DESTROYING CYANIDES

The invention herein described was made in the course of or under a contract with the United States Air Force.

BACKGROUND OF THE INVENTION

1. Field of the Invention

This invention relates to a method for the destruction of cyanides, particularly, cyanides complexed with iron; more particularly the present invention relates to a method for the destruction with cyanides complexed with iron, employing as agents an ozone containing gas and ultraviolet light.

2. Description of the Prior Art

The cyanide compounds present in waste effluents from certain chemical manufacturing operations, the steel industry, mining, photographing processing, and from metal plating processes can present serious pollution problems. If such waste effluents are discharged into rivers or lakes without proper treatment, the toxic cyanide compounds can contaminate various municipal water supplies. Even if such waste effluents are deposited on land masses, the cyanide contents can eventually pass through the soil and reach water supplies.

Numerous methods have been suggested to destroy undesirable cyanides. Thus, for example, it has been proposed that the undesirable cyanides can be precipitated as insoluble heavy metal compounds by the addition of a heavy metal salt to the cyanide solution. This method, however, is somewhat disadvantageous in that bulky equipment is required, and the cyanides cannot be completely eliminated.

In addition, various chemical methods have been proposed for the elimination or destruction of undesirable cyanides, including the addition of peroxides and combination of peroxides with other materials and the addition of active chlorine for the purpose of oxidation of the cyanides.

The oxidation of cyanides to cyanates by active chlorine is a somewhat popular method, although its disadvantages are far from negligible. Oxidation by chlorine, or hypochlorites gives cyanyl chloride, then cyanate, and finally, but very slowly, carbon dioxide and nitrogen or ammonia.

Cyanyl chloride, which is volatile and as toxic as hydrocyanic acid, becomes dangerous when the concentration of cyanides to be destroyed becomes too high or the pH is not alkaline enough. On the other hand, the reaction is slow. There is a risk of rejection of incompletely treated wastes, containing residual free cyanides. If the reaction is speeded up by increasing the proportion of chlorine or hypochlorite, the excess remains in the effluent, which increases the salt content of the effluent and leaves free chlorine, which is deleterious to the fauna and flora of rivers.

While the above procedures are usually satisfactory for most purposes and can effectively eliminate most cyanides, the foregoing procedures, specifically, the utilization of active chlorine, have been found unsatisfactory with regard to those cyanide materials in which the cyanide radical is complexed with iron. In this regard, cyanide which is complexed with iron occurs frequently as a toxic component of effluents, from various industrial processes such as photo processing and metal finishing operations. Such cyanide complexed with iron must be destroyed or eliminated to provide a waste water which meets pollution standards. Therefore, consideration has been given to the development of an economic process which can effectively destroy such cyanides.

Alkaline chlorination, such as described above, is ineffective to eliminate or destroy cyanides complexed with iron, since the chemical bonds of the iron cyanide, while not particularly strong, are not oxidized or broken down by the alkaline chlorination method or other usual cyanide elimination treatments. Accordingly, prior to the development of the present invention the iron cyanide which is present as a component of effluents of various industrial processes has been either discharged untreated, a very unsatisfactory approach from pollution standards, or a somewhat less than efficient partial precipitation technique was employed in which precipitation of the iron cyanide was attempted by adding a metal salt such as ferric chloride or ferric sulphate, followed by settling, centrifuging, or filtering to remove the solids containing cyanide. This procedure, however, is far from satisfactory in that the cyanides present, specifically, cyanides complexed with iron, cannot be totally destroyed. Moreover, the necessary addition of chemicals in the foregoing procedures results in disadvantages in that, in addition to the insufficiency of the reaction, a toxic sludge remains which presents disposal problems.

While ozone has for sometime been proposed as a material which can effectively treat liquid waste material, no satisfactory utilization of ozone, specifically in the environment of the present invention, has been provided. In this regard, ozone treatments have been considered to be too expensive and too inefficient for the treatment of the large quantities of waste water which are usually present in normal commercial operations. Therefore, ozone treatment of waste water has not been generally accepted by the industrial community and has not been used to any appreciable extent in large scale commercial operations. Moreover, ozone treatments suggested prior to the present invention have required relatively large pieces of equipment as compared to the amount of material being treated, and such treatments have been expensive, due to the poor ozone utilization and the cost of ozone.

SUMMARY OF THE INVENTION

The method of the present invention allows for the effective utilization of ozone in the destruction of cyanides, specifically, cyanides complexed with iron. In accordance with the method of the present invention, this destruction of such cyanides in an aqueous cyanide solution is provided by contacting an aqueous solution of cyanides with an ozone-containing gas and simultaneous irradiating the aqueous cyanide solution with ultraviolet light.

In accordance with the present invention, the contact of the aqueous solution of cyanides and ozone-containing gas is preferably carried out while maintaining the pH of the aqueous solution of cyanides within the range of 5–9. In addition, the reactivity of the system can be enhanced by heating the aqueous cyanide solution to a temperature of from about 30° to about 70° C. during the contact with the ozone-containing gas, if necessary.

The method of the present invention is preferably carried out by contacting the aqueous cyanide solution and ozone-containing gas in a plurality of separate contact zones, countercurrently or with parallel flow, with the simultaneous irradiation with ultraviolet light being carried out in at least one of the separate contact zones, preferably, at least in the last zone of contact between the aqueous cyanide solution and ozone-containing gas wherein the cyanide ion concentration is a minimum, and the reaction rate must be enhanced.

Accordingly, it is a principal feature of the present invention to provide a novel method for the destruction of cyanides, particularly cyanides complexed with iron, in a manner which eliminates the disadvantages and deficiencies of previously proposed methods.

It is a further feature of the present invention to provide such method for the destruction of cyanides, specifically cyanides complexed with iron, wherein an aqueous cyanide solution is contacted with an ozone-containing gas while simultaneously irradiating the aqueous cyanide solution with ultraviolet light.

It is a still further feature of the present invention to provide such method for the destruction of cyanides, wherein the contact of the aqueous cyanide solution with the ozone-containing gas is carried out while maintaining the aqueous solution at a pH within the range of 5–9, with optional heating of the aqueous cyanide solution.

Yet a further feature of the present invention resides in such method for the destruction of cyanides complexed with iron, wherein an aqueous cyanide solution is contacted with an ozone-containing gas in a plurality of separate contact zones, countercurrently or with parallel flow, with simultaneous irradiation of the aqueous cyanide solution with ultraviolet being carried out in at least one of the separate contact zones, preferably that zone in which the cyanide concentration is a minimum.

It is yet a further feature of the method of the present invention to provide such destruction of cyanides, specifically cyanides complexed with iron, utilizing a combination of an ozone-containing gas and irradiation with ultraviolet light, wherein such method includes the advantages of no chemical addition to water, no cyanide discharged with the treated water, no toxic sludge requiring disposal, and total destruction of the cyanides.

Still further features and advantages of the method of the present invention will be apparent from the following, more detailed description thereof.

BRIEF DESCRIPTION OF THE DRAWINGS

In the drawing, the single FIGURE illustrates a preferred system for carrying out the method of the present invention.

DESCRIPTION OF PREFERRED EMBODIMENTS

The liquid material which is subjected to the method of the present invention is an aqueous cyanide solution, more particularly an aqueous cyanide solution wherein the cyanide is complexed with iron. The cyanide complexed with iron occurs as a toxic component of effluents from various industrial processes, such as from photo processing and metal finishing operations. By the method of the present invention, such waste waters from the foregoing industrial processes can be treated so that the waste water meets pollution standards with regard to cyanide content.

The essential elements utilized in carrying out the method of the present invention are an ozone generator to supply ozone which reacts with the cyanide component in the aqueous cyanide solution; at least one vessel or contact zone which contains the cyanide solution while in contact with an ozone-containing gas; and a source of ultraviolet light which effectively increases the reaction rate between the cyanide and ozone. The fastest and most efficient reaction between the cyanide and ozone in accordance with the present invention is achieved by controlling the pH of the aqueous cyanide solution between pH 5 and pH 9. In addition, where desired for particular purposes, a more efficient reaction between the cyanide and ozone can be achieved by heating the aqueous cyanide solution during the reaction with ozone.

The method of the present invention, with regard to the destruction of cyanides, specifically, cyanides complexed with iron, can be achieved utilizing a single vessel or contact zone, or can be achieved utilizing a plurality of contact zones arranged for countercurrent contact of the aqueous cyanide solution and ozone or parallel contact of the same. The use of the plurality of contact zones, at least one of which includes a source of ultraviolet light, is preferred in accordance with the present invention to provide optimum efficiency in the utilization of the ozone supply.

As described above, the first essential element in carrying out the method of the present invention is an ozone generator. Any of the conventionally employed and available ozone generator devices can be applicably employed in accordance with the present invention. Thus, for example, a particularly suitable ozone generator is available under the trade designation "Advanced Corona Generator" from Purification Sciences, New York, N.Y. Such a generator is described, for example, in German Offen. No. 2,026,622, issued Dec. 10, 1970, and entitled "Corona Discharge Apparatus for Generating Ozone Under Pressure".

Other commercially available ozone generators such as ones of the concentric tube type or the plate type can be utilized. A detailed discussion of these types of generators can be found in the McGraw-Hill Encyclopedia of Science and Technology, McGraw-Hill, Inc., 1966, volume 9, page 479.

The second essential element for carrying out the method of the present invention is at least one reaction vessel or contact zone. This reaction vessel or contact zone, in accordance with the present invention, can take any typical shape, but is generally a reaction tower, which allows effective contact between the aqueous cyanide solution and ozone-containing gas. Preferably, the tower is constructed of a material which is resistant to oxidation and ozonation, such as carbon-steel lined with a suitable material such as Teflon, polyvinyl chloride, or polypropylene. In a preferred embodiment of the present invention, the tower is so constructed that a downwardly-flowing stream of the aqueous cyanide solution is contacted with an upwardly-flowing stream of ozone-containing gas. To provide for a more efficient dispersion of the ozone-containing gas into the cyanide solution, the tower can be provided with such means as a mixer, a porous stone diffuser, ozone ejector, or other suitable means to provide a large number of small bubbles so as to obtain the necessary satisfactory mass transfer of the ozone from the gas phase to the liquid phase. Alternatively, the tower which can be employed as the reaction zone in accordance with the method of the present invention, can, where desired, be packed with any of the known packing materials employed in such liquid-gas contact towers, so as to provide maximum surface area for contact between the ozone-containing gas and aqueous cyanide solution. Some conventional packing shapes including Raschig rings, Berl saddles, Pall rings and Intalox saddles manufactured by Norton Co. The packing can be constructed of any convenient material such as porcelain, clay, carbon, and suitable plastics.

As previously indicated, in a preferred embodiment of the present invention, the method of the present invention is carried out utilizing a plurality of separate contact zones, i.e., two or more contact zones, preferably two to four contact zones, in which the aqueous cyanide solution is contacted with the ozone-containing gas. Each of these contact zones is preferably constructed as described above, from a material which is resistant to oxidation and ozonation. Moreover, each of these contact zones can include some means for dispersing the ozone gas in the aqueous cyanide solution, and can optionally include any of the conventional packing shapes described previously.

Where more than one contact zone is employed as in accordance with the preferred embodiment of the present invention, the reaction zones can be physically located one on top of the other, or can be physically separated. Preferably, the reaction zones are so situated as to form a single tower construction containing the plurality of separate contact zones therein.

In the preferred embodiment of the present invention, the aqueous cyanide solution and ozone-containing gas are brought into contact countercurrently with the aqueous cyanide solution flowing downwardly in the reaction tower through successive contact zones and the ozone-containing gas flowing upwardly through the reaction tower through successive contact zones. Since the reaction between the cyanide ions and ozone will occur most efficiently and at the fastest rate where the concentration of cyanide ions is the greatest, varying conditions can be employed in the various separate contact zones with the most severe conditions being maintained in the contact zone in which the concentration of cyanide ions is the lowest. For example, where a plurality of contact zones are employed, it may be necessary to increase the reaction rate through the use of ultraviolet light only in those zone(s) where the concentration of cyanide is low.

The third component necessary to carry out the method of the present invention is the source of ultraviolet light. This source of ultraviolet light can take any conventional form and is generally a conventional light source which emits irradiation within the ultraviolet region of the spectrum. Any typical source of ultraviolet light can be utilized in accordance with the method of the present invention.

As previously described, in addition to the increase in reaction rate which is achieved through the irradiation with ultraviolet light, where desired, a still faster reaction can be achieved by maintaining the pH of the aqueous cyanide solution between pH 5 and pH 9. This produces the fastest and most efficient reaction between the cyanide ion and ozone. No pH control is required, however, to produce an efficient reaction.

Still further, under certain circumstances, additional efficiency can be provided by heating the aqueous cyanide solution. In this regard, optimum results are achieved when the aqueous cyanide solution is contacted with the ozone-containing gas with the solution being at a temperature of from about 30° to about 70° C. The method of the present invention, however, can be successfully carried out over a wide temperature range and is not limited to the above range.

A preferred embodiment for carrying out the method of the present invention is illustrated in the accompanying FIGURE. As illustrated in the FIGURE, a supply of aqueous cyanide solution, specifically, a cyanide complexed with iron, is pumped from feed tank 10 through line 12 by means of metering pump 14 to the top of reaction tower 20. Typically, an aqueous cyanide solution obtained as an industrial effluent from such processes as photo processing and metal finishing operations will contain a concentration of cyanide ions of from about 1 to about 4,000 milligrams per liter although the method of the present invention is applicable to lower and much higher cyanide ion concentrations. The rate of flow of the aqueous cyanide solution from feed tank 10 through line 12 into reaction tower 20 can vary over extremely wide limits, depending upon many factors, including the ability of the equipment to handle the necessary flow rate, the number of contact zones employed for contact between the aqueous cyanide solution and ozone-containing gas and the concentration of cyanide ions within the aqueous cyanide solution.

As illustrated, an ozone generator 30 is provided to generate an ozone-containing gas, which is introduced to the bottom of reaction tower 20 through line 32. As previously described, any of the conventionally employed ozone-generating devices can be applicably employed in accordance with the method of the present invention. One typical ozone-generating device generates a gas which comprises from about 1 to about 8 percent by weight ozone, from about 20 to about 99 percent by weight oxygen, and up to about 80 percent by weight nitrogen with possibly small quantities of other gases which are normally present in air, such as carbon dioxide, argon, and the like. The expression, "ozone-containing gas" is meant to embrace any and all gasses which are generated by an ozone generator and the amount of ozone and other components of the ozone-containing gas can be varied within wide limits while still achieving the advantages of the method of the present invention.

As was the case with regard to the feed of the aqueous cyanide solution, the flow of ozone into the bottom of reaction tower 20 through line 32 can be varied within extremely wide limits with any amount effective to destroy the cyanides being applicable. The amount of ozone, however, is generally controlled, based upon the concentration of cyanide ions in the aqueous cyanide solution feed, and based upon the desired final concentration of cyanide ions in the treated water. While any particular flow of ozone will depend upon additional factors, including the number of contact zones employed, satisfactory results are achieved in accordance with the present invention when the ozone-containing gas is supplied to the reaction tower in an amount, in terms of the ozone contained therein, within the range of 1.8 to 4.7 mg. per one mg. cyanide ion at 4,000 milligrams per liter of cyanide ion concentration. Where the initial cyanide concentration is greater than 4,000 mg/l, a greater supply of ozone may be necessary, and, also, the process of the present invention may be very satisfactorily carried out using less ozone under certain circumstances. Operation within the foregoing limits provides efficient destruction of cyanide ions and the production of a treated water meeting all pollution standards.

As illustrated in the attached FIGURE, reaction tower 20 is separated into three contact zones, 40, 42 and 44, with the feed of aqueous cyanide solution through line 12 being introduced into the top of contact zone 40 and the feed of ozone-containing gas being introducted into the bottom of contact zone 44 through line 32. This arrangement, as illustrated, provides for countercurrent contact of the aqueous cyanide solution and ozone-containing gas in each of the contact zones in accordance with the preferred embodiment of the present invention. While the arrangement illustrated in the attached FIGURE shows each of the contact zones 40, 42, and 44 as part of the same reaction tower 20, the different contact zones employed in this preferred embodiment of the present invention can be physically separated. In addition, the method of the present invention can be advantageously carried out utilizing parallel contact of the ozone-containing gas and cyanide solution where desired. All that is required is that efficient utilization of the ozone be achieved through the required intimate contact between the ozone-containing gas and aqueous cyanide solution.

As illustrated in the attached FIGURE, contact zones 40, 42 and 44 are identically constructed. These contact zones can take varying forms, although it is preferred that the individual contact zones be constructed of material which is resistant to oxidation and ozonation. Moreover, within the same tower, the contact zones can be of varying sizes and dimensions, as well as include different elements based upon different concentrations of cyanide ions within the separate contact zones.

In accordance with the present invention, each of reaction zones 40, 42 and 44 can be a simple reaction vessel in which the ozone-containing gas is bubbled through the aqueous cyanide solution or alternatively can be in the form of a packed contact zone in which each of zones 40, 42 and 44 contains a packing material (not shown) such as previously described.

Referring again to the attached FIGURE, each of contact zones 40, 42 and 44 in the embodiment illustrated is provided with a suitable means 50 to disperse the ozone-containing gas into the aqueous cyanide solution. As previously indicated, such means can be a porous stone diffuser, ejector, or any other suitable means of providing a large number of small bubbles to obtain the desired good mass transfer from the gas phase into the liquid phase. Optionally, each contact zone can be provided with a blade mixer 52 on shaft 54, driven by motor 56. Alternatively, packed contact zones can be used to achieve such intimate contact.

Each of contact zones 40, 42, and 44 is similarly provided with a temperature control element 60, a source of ultraviolet light 62, and a suitable means to control the pH of the aqueous cyanide solution, indicated as element 64. While each of these sources or controls is shown as illustrated in connection with each of the contact zones is the attached FIGURE, it is merely necessary in accordance with the present invention, when utilizing a plurality of contact zones, that a source of ultraviolet light be provided in at least one of the contact zones, so as to simultaneously irradiate the aqueous cyanide solution when in contact with the ozone-containing gas. The use of a temperature control or pH control is optional in connection with each of the contact zones.

Each of the controls and sources illustrated provides for an increase in the reaction rate between the aqueous cyanide solution, specifically, the cyanide ions and the ozone present in the ozone-containing gas. In this regard, the source of ultraviolet light provides for a dramatic increase in the reaction rate over that which could be achieved absent such ultraviolet light. Moreover, control of the pH of the aqueous cyanide solution between about pH 5 and about pH 9 yields the fastest and most efficient reaction between the cyanide ions and ozone. Accordingly, while it may be preferred in accordance with the present invention to provide such pH control to achieve the most efficient and fastest reaction, the pH control of the aqueous cyanide solution is optional, and an efficient reaction between the cyanide ions and ozone can be achieved over a wide range of pH absent such pH control.

The means to control the pH in accordance with the present invention can be any conventional sensing means with an associated addition of an acid or alkaline material to the aqueous cyanide solution to bring the pH within the foregoing range. Any conventional material capable of achieving this function can be satisfactorily employed in accordance with the method of the present invention.

In a manner similar to the case of the pH control, the temperature control in accordance with the present invention is optional in that an efficient reaction between the cyanide ions and ozone can be achieved absent temperature control, over a wide range of temperatures from below room temperature to greatly elevated temperatures. However, the heating of the aqueous cyanide solution to a temperature within the range of from about 30° C. to about 70° C. produces maximum efficiency and the fastest possible reaction between the cyanide ions and ozone. Accordingly, for certain particular purposes, it may be desirable to utilize such temperature control and heat the aqueous cyanide solution to a temperature within the above range. Any typical means for sensing the temperature of the aqueous cyanide solution and adjusting the temperature thereof in response to such sensing can be satisfactorily employed in accordance with the method of the present invention.

As previously indicated, it is necessary in accordance with the present invention that ultraviolet light be irradiated on the contacting aqueous cyanide solution and ozone-containing gas in at least one contact zone. Referring to the attached FIGURE in the embodiment illustrated, since the concentration of cyanide ions in contact zone 44 will be the lowest concentration of any of the three contact zones, where the ultraviolet light is irradiated in only one of the three contact zones, the irradiation is preferably carried out in contact zone 44.

In addition to the inclusion of the source of ultraviolet light in the last contact zone 44, such irradiation can be carried out also in contact zones 42 and 40 to achieve the desired increase in reaction rate. However, it has been determined in accordance with the present invention that where the concentration of cyanide ions is great, as in contact zone 40, when employing an aqueous cyanide solution having a high concentration of cyanide ions, the reaction rate is sufficiently fast and sufficiently efficient absent the ultraviolet light irradiation. Accordingly, for many applications, it is satisfactory to contact the aqueous cyanide solution and ozone-containing gas in one or more contact zones of a plurality of contact zones absent irradiation with ultraviolet light and absent pH and temperature control.

While the aqueous cynaide solutions generally occurring as waste effluents contain from about 1 to about 4,000 milligrams per liter of the cyanide ions, the method of the present invention can be satisfactorily carried out with lower or higher concentrations of cyanide ions. In this regard, it has been discovered in accordance with the present invention that the combined irradiation with ultraviolet light and reaction with ozone from an ozone-containing gas can effectively destroy the cyanide ions in concentrations as low as 0.05 milligrams per liter, up to concentratios of 100,000 or more milligrams per liter. When the concentration of cyanide ions is above about 50 milligrams per liter, in the initial contact zones wherein the concentration is above this limit, the effective destruction of the cyanide ions can be achieved without the irradiation with ultraviolet light. Generally, however, the reaction rate will be increased by utilizing a pH control so as to bring the pH of the aqueous cyanide solution within the range of between pH 5 and pH 9, and/or temperature control of the aqueous cyanide solution. The final contact zone or zones should employ the irradiation with ultraviolet light so as to bring the final cyanide ion concentration to within acceptable limits. For concentrations of cyanide ions below 1 milligram per liter, it is necessary to employ ozone and ultraviolet light, although temperature control and pH control may not be necessary.

Returning to the attached FIGURE, in the embodiment illustrated, the ozone-containing gas which enters the bottom of contact zone 44 and is dispersed in the aqueous cyanide solution by means of a suitable dispersing means 50, exits contact zone 44 through line 80, whereupon it is introduced into contact zone 42 by means of a similar dispersing element. The ozone-containing gas exits contact zone 42 through line 82 and is introduced into contact zone 40 by means of a similar dispersing element 50, the exhaust gas being exited to the atmosphere by means of exit line 84. The concentration of ozone in the system will decrease from the maximum concentration delivered by ozone generator 30 to the minimum concentration in exit gas exiting via line 84 due to consumption of the ozone in its reaction with the cyanide ions in the various contact zones.

While the specific system illustrated in the attached FIGURE shows three contact zones, any number of contact zones can be utilized to achieve the advantageous features of the present invention. Accordingly, as previously noted, the present invention can be carried out with a single contact zone or with a plurality of contact zones unlimited in number. For practical purposes, however, efficient destruction of the cyanide ions can be achieved through the use of three contact zones as illustrated.

The method of the present invention has advantages over conventional processes in that, by the method of the present invention, the cyanide ions can be substantially completely destroyed. This is achieved in accordance with the present invention without the necessity of adding chemicals to the aqueous cyanide solution and the substantial total destruction avoids the discharge of cyanides with the treated water. In addition, no toxic sludge remains in accordance with the present invention, thereby distinguishing the method of the present invention from those developed heretofore.

The foregoing advantages of the present invention are achieved through the provision of contacting an aqueous solution of cyanides, specifically cyanides complexed with iron, with an ozone containing gas, while simultaneously irradiating the aqueous cyanide solution with ultraviolet light. As previously noted, further features of the present invention include the maintaining of the pH of the aqueous cyanide solution within the range of pH 5 to pH 9 and heating the aqueous cyanide solution to a temperature of from about 30° to about 70° C. during contact with the ozone-containing gas. Each of these optional features of the present invention has the effect of further increasing the efficient destruction of cyanides achieved in accordance with the present invention.

The present invention will now be described by reference to the following specific examples, which examples are presented for purposes of illustration only, and the present invention cannot, under any circumstances, be deemed limited thereby.

EXAMPLES 1-3

Employing apparatus such as illustrated in the attached FIGURE and varying the number of stages employed, cyanides present in aqueous cyanide solutions were destroyed through the combination of ozone reaction and irradiation with ultraviolet light. Three sources of aqueous cyanide solutions were employed: Example 1 — a copper plating solution; Example 2 — a nickel stripping solution; and Example 3 — a ferricyanide bleach solution, with the initial aqueous solution of each source having approximately 4,000 mg. of cyanide ions per liter. The results obtained utilizing the method of the present invention can be seen in Table 1, following.

TABLE 1

| | | Influent to Stage 1 | Stage 1 | Stage 2 | Stage 3 | Stage 4 | Stage 5 | Stage 6 |
|---|---|---|---|---|---|---|---|---|
| 1 Copper Plating Solution | Total Cyanide, mg/l | 4000. | 17. | <0.5 | <0.1 | | | |
| | Cyanate, mg/l | 0. | | | 110. | | | |
| | Temperature, °C | 20. | 20. | 20. | 66. | | | |
| | pH | 11.5 | | | 7.7 | | | |
| | UV Light, Watts | — | 0. | 0. | 75. | | | |
| | Liquid Flow, liter/hour | 2.36 | 2.36 | 2.36 | 2.36 | | | |
| | Ozone added, gm/hr | — | Gases from Stage 2 & 3 | 37.1 | 2.65 | | | |
| 2 Nickel Stripping Solution | Total Cyanide, mg/l | 4000. | <110. | <0.6 | <0.1 | | | |
| | Cyanate, mg/l | 0. | | | 470. | | | |
| | Temperature, °C | 20. | 20. | 20. | 66. | | | |
| | pH | 11.8 | | | 8.5 | | | |
| | UV Lights, Watts | — | 0. | 0. | 75. | | | |
| | Liquid Flow, liter/hour | 2.36 | 2.36 | 2.36 | 2.36 | | | |

TABLE 1-continued

| | Influent to Stage 1 | Stage 1 | Stage 2 | Stage 3 | Stage 4 | Stage 5 | Stage 6 |
|---|---|---|---|---|---|---|---|
| Ozone added, gm/hr | — | 31.7 | 4.91 | 3.02 | | | |
| 3 Ferricyanide Bleach Solution | | | | | | | |
| Total Cyanide, mg/l | 4000. | 2680. | 1630. | 710. | 105. | 13. | <0.3 |
| Cyanate, mg/l | 0. | | | | | | 47. |
| Temperature, °C | 20. | 66. | 66. | 66. | 66. | 66. | 66. |
| pH | | | | | | | 8.9 |
| UV Light, Watts | — | 0. | 0. | 0. | 0. | 0. | 75. |
| Liquid Flow, liter/hour | 2.36 | 2.36 | 2.36 | 2.36 | 2.36 | 2.36 | 2.36 |
| Ozone added, gm/hr | — | 9.45 | 7.18 | 7.18 | 9.15 | 7.18 | 7.18 |

It can be seen that in Example 1 irradiation with ultraviolet light was carried out only in the third and last stage. Similarly, pH control and temperature control were employed only in the third and last stage. By proceeding in this manner, the cyanide concentration in the aqueous cyanide solution was reduced to a value of less than 0.1 mg. per liter. Similar results were achieved in Examples 2 and 3, in which the ultraviolet light irradiation was carried out only in the final stage. In Example 3, temperature control was employed in all but the initial stage of the reactions. In all three examples, the destruction of cyanides was substantially complete.

While the present invention has been described primarily with regard to the foregoing specific exemplification, it should be understood that the present invention cannot, under any circumstances, be limited thereto, but rather must be construed as broadly as any and all equivalents thereof.

What is claimed is:

1. A method for the destruction of cyanides in an aqueous cyanide solution, which comprises:
   contacting an aqueous solution of cyanides with an ozone-containing gas in an amount effective to react with and destroy the cyanides; and
   simultaneously irradiating said aqueous cyanide solution with ultraviolet light.

2. The method of claim 1, wherein the pH of said aqueous cyanide solution is maintained within the range of about pH 5 to about pH 9.

3. The method of claim 1, wherein said aqueous cyanide solution is heated to a temperature of from about 30° to about 70° C. during the contact with ozone containing gas.

4. The method of claim 1, wherein said aqueous cyanide solution and ozone-containing gas are contacted in parallel flow.

5. The method of claim 1, wherein said aqueous cyanide solution and ozone-containing gas are contacted while flowing coutercurrently.

6. The method of claim 1, wherein said aqueous cyanide solution and ozone-containing gas are contacted in a plurality of separate contact zones and the simultaneous irradiation with ultraviolet light is carried out in at least the last of said separate contact zones.

7. The method of claim 6, wherein the irradiation with ultraviolet light is carried out in the final contact zone of said plurality of contact zones.

8. The method of claim 1, wherein said cyanide is complexed with iron.

9. A method for the destruction of cyanides complexed with iron in an aqueous solution which comprises:
   providing a feedstock comprising an aqueous solution of cyanides complexed with iron and a plurality of contact zones in series;
   passing said aqueous solution of cyanides complexed with iron into a first contact zone of said plurality of contact zones in series;
   simultaneously passing an ozone-containing gas into the last contact zone of said plurality of contact zones in series, the amount of ozone being effective to react with and destroy said cyanides complexed with iron, whereby said aqueous solution of cyanides complexed with iron and ozone-containing gas come into mutual contact in each of said plurality of contact zones while passing countercurrently therethrough;
   simultaneously irradiating at least one of said plurality of contact zones with ultraviolet light from an ultraviolet light source;
   withdrawing from said first of said plurality of contact zones said ozone-containing gas, leaner in ozone; and
   withdrawing from said last of said plurality of contact zones said aqueous solution with reduced cyanide content.

10. The method of claim 9, wherein the pH of said aqueous solution of cyanides complexed with iron is maintained within the range of about pH 5 to about pH 9 in at least one of said plurality of contact zones.

11. The method of claim 9, wherein said aqueous solution of cyanides complexed with iron is heated to a temperature of about 30° to about 70° C. in at least one of said plurality of contact zones.

12. The method of claim 9, wherein the irradiation with ultraviolet light is carried out in at least the last contact zone of said plurality of contact zones.

13. The method of claim 9, wherein said aqueous solution of cyanides complexed with iron and ozone-containing gas are contacted in parallel flow.

* * * * *